United States Patent Office 3,511,514
Patented May 12, 1970

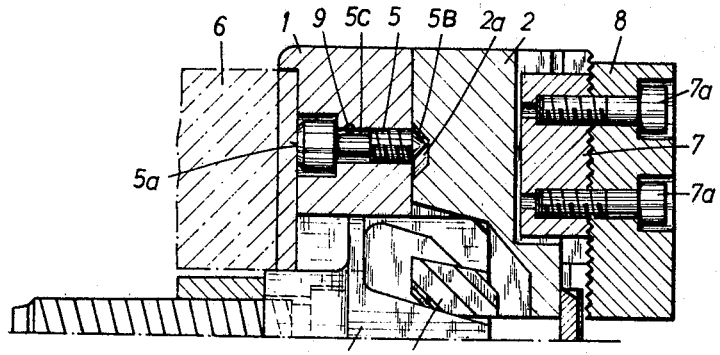
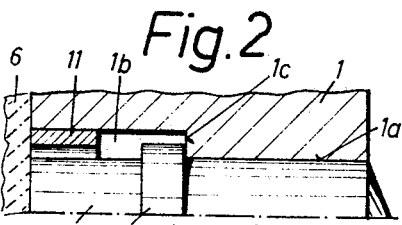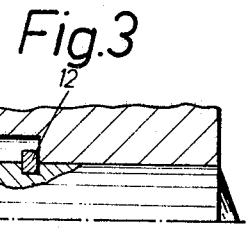
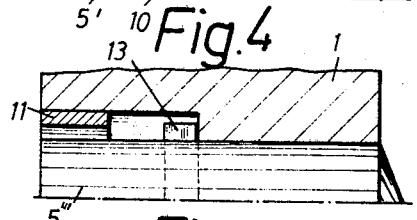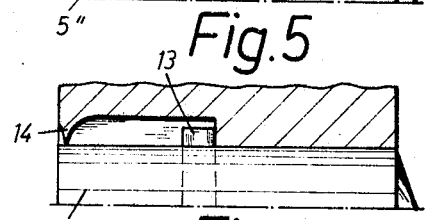
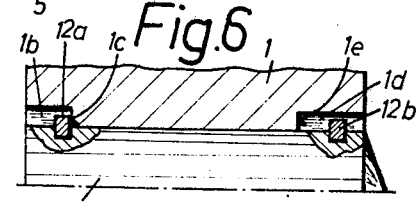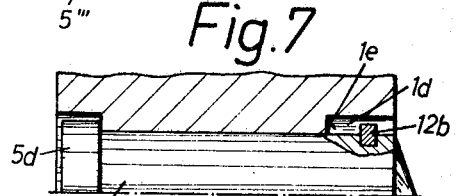
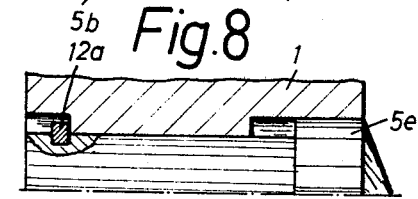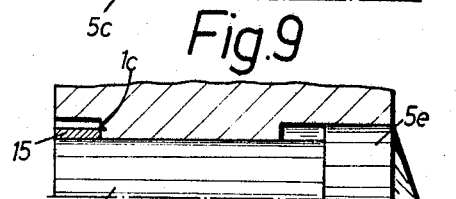
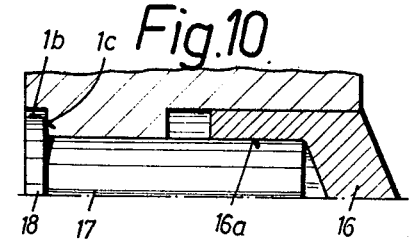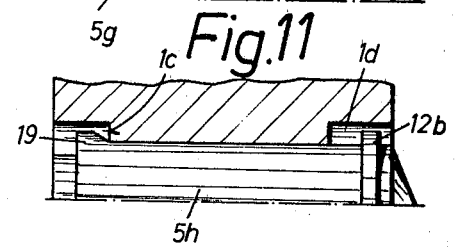

3,511,514
JAW CHUCK
Karl Deuring, Dusseldorf, Germany, assignor to Paul Forkardt KG, Dusseldorf, Germany
Filed Sept. 27, 1966, Ser. No. 582,326
Claims priority, application Germany, Oct. 1, 1965, F 47,328
Int. Cl. B23b 23/10
U.S. Cl. 279—123                                                                 4 Claims

ABSTRACT OF THE DISCLOSURE

A safety means built into and movable in a chuck body from which removal thereof is precluded by groove end defining portions engageable by abutment means on a pin of the safety means. The safety means has an end axially movable into a groove of a jaw means secured against being thrown out from the chuck body after a break occurs in a machine tool drive.

---

The present invention relates to a device for securing radially guided clamping jaws of jaw chucks and the like against being thrown out from the chuck body after a break occurs in the drive, and more specifically, the present invention relates to a device of this type in which a safety pin cooperates with a recess or a protrusion on the back side of the jaw.

In connection with radially guided jaws of jaw chucks, a holding device has become known in which for each holding pin, an abutment edge is provided in the counter body, and in which the holding pin can by a special tool only be displaced in that position in which the jaw can be withdrawn. Such an arrangement safely prevents the holding device from being disconnected unintentionally. A device of this type, however, requires numerous elements and therefore is relatively expensive. Therefore, simple holding screws have been provided which permit a disassembly of the jaws only when the chuck is entirely disassembled. For this reason, the safety screw is so arranged behind the base jaw in the chuck body that it can be turned back only when the chuck has been removed from the spindle. Such an arrangement, however, yields no genuine additional safety. Experience has shown that an operator repairing such chuck or thoroughly cleaning the same frequently does not recognize the purpose of the safety screw so that he considers said screw as superfluous when reassembling the chuck and does not return said safety screw so that the safety device is lacking and accidents are possible.

It is, therefore, an object of the present invention to provide a safety device for clamping jaws in the form of a safety pin, which will overcome the above mentioned drawbacks.

It is another object of this invention to provide a safety device as set forth above, in which the safety means will operate automatically and cannot be lost.

These and other objects and advantages of the invention will appear more clearly from the following specification in connection with the accompanying drawings, in which:

FIG. 1 represents a longitudinal section through a two-jaw chuck of a heretofore known device.

FIGS. 2 to 11 respectively illustrate in longitudinal section a plurality of safety pins for use for instance in connection with the chuck of FIG. 1.

The arrangement according to the present invention is characterized primarily in that a safety pin axially displaceable in the chuck body has its rear end in engagement with the connecting flange or the spindle head while its front end extends into the path of the base jaw, said pin being prevented from complete detachment from the chuck when the latter is removed from the machine tool. With an arrangement of this type, the safety pin cannot be completely removed when repairs or the like are effected but it remains in the base body and can be removed only by special tools and under special efforts. On the other hand, the chuck cannot be connected to the connecting flange or the spindle unless the safety pin occupies its correct position. In this way, the base jaws are always safely prevented from being thrown out in case the moving hook breaks. Thus, the arrangement according to the present invention increases the safety against accidents.

The invention may be realized in various forms. Thus, the safety pin may be designed in a manner known per se as a screw the head surface of which engages the connecting flange or the spindle when the pin occupies its blocking position. The said screw is prevented from being completely screwed out by means of a transverse pin arranged in the chuck body and extending into a recess of the screw. Consequently, when withdrawing the chuck, the screw cannot be lost.

It is particularly advantageous to provide a simple smooth pin with an enlargement, a collar, a transverse pin, a spring ring, or the like while the enlargement when withdrawing the chuck will in the direction toward the connecting flange rest against an abutment provided in the bore of the pin, said abutment may be formed by a clamping sleeve, an upset portion, or the like. In this way, it will be assured that without special effort and without a tool, it is possible to move the safety pin out of its blocking position when the chuck is withdrawn.

This enlargement or a special element such as a spring ring connected to the pin for preventing the withdrawal of the pin may also act in the direction toward the base jaw upon an abutment, advantageously upon a step in the bore for the pin, so that also in the direction toward the base jaw, the safety pin is firmly located as to its position so that its front tip or dome cannot contact the base surface of the groove of the base jaw.

According to another embodiment, the pin may be composed of a front thickened head portion with a bore and a shank pressed into the bore and provided with a collar or the like.

Referring now to the drawing in detail, and FIG. 1 thereof in particular, this figure shows a chuck with a jaw means including a basic jaw 2 guided in a manner known per se in the chuck body 1. Each jaw 2 is, likewise in a manner known per se, operatively connected to a central piston-shaped member 4 by means of a motion hook 3. In view of the longitudinal movement of said piston-shaped member 4, the jaws are subjected to a radial movement. In order to be able to remove the jaws from the chuck, the motion hooks 3 can be disengaged by turning the piston-shaped member 4.

In order to prevent the jaws from being thrown out in case of a break of the motion hook for instance due to overloading, a safety pin 5 is provided which is designed in the form of a screw. This safety pin 5 is so arranged that its head surface 5a in assembled condition engages the connecting flange 6 or the spindle head. The front end 5B of the safety pin 5 extends in a manner known per se into a groove 2a of the basic jaw 2 on which the face jaw is connected by means of a groove block 7 and screws 7a.

In order to prevent the safety screw 5 from being completely screwed out when removing the basic jaw 2, with the danger that the screw 5 is not screwed back again, there is, in conformity with the present invention, provided a transverse pin 9 tangentially in the chuck. This transverse pin extends into the bore of screw 5 which is provided with a cutout 5C whereby a corresponding path for the screw 5 is obtainable. According to the embodiments of FIGS. 2 to 11, a smooth safety pin 5 is employed which is loosely inserted into the corresponding bore 1a of the chuck body 1. In order to prevent this pin from dropping out of the chuck body after the chuck body has been removed from the spindle, the arrangement of FIG. 2 provides that pin 5' is equipped with a collar 10 which has opposite ends forming first and second abutment means and which extends into the broadened portion 1b of bore 1a. The outer end of this broadened portion 1b is provided with a clamping sleeve or a cemented-in bushing 11 forming a first groove end face portion having an inner abutment surface so that the safety pin 5' can move over one path only which corresponds approximately to the head of the safety pin which head protrudes from the basic body. In installed condition, the collar 10 engages a shoulder 1c forming a second groove end face portion having an inner abutment surface whereby the displacement of the pin toward the front will be limited. According to FIG. 3, instead of collar 10, a spring ring 12 is connected to the safety pin 5" The safety effect is the same as set forth in connection with FIG. 2.

According to FIG. 4, the safety pin 5''' is provided with a transverse pin 13 which limits the movement of the safety pin 5''' toward either side. FIG. 5 indicates that this transverse pin 13 rests against an upset portion 14 in order to prevent the safety pin from dropping out.

According to the embodiment of FIGS. 2 to 5, the broadened portion 1b of bore 1a is located on that side of the chuck body 1 which faces the connecting flange 6. With the embodiments according to FIGS. 6 to 11, in addition to this broadening portion 1b, also on the other side of the chuck body 1 there is provided a broadened bore 1d presenting an inner abutment surface 1e. In conformity with FIG. 6, two spring rings 12a and 12b are provided as first and second abutment means each having abutment surfaces which limit the movement of the safety pin on both sides. In conformity with FIG. 7, the spring ring 12a has been replaced by a collar or head 5d, whereas according to FIG. 8 the spring ring 12b has been replaced by a corresponding head 5e. FIG. 9 shows an embodiment in which instead of the spring ring 12a there is provided a bushing 15 cemented to pin 5g.

According to FIG. 10, the pin may also be produced in two parts employing an enlarged head 16 which is provided with a bore 16a. A shaft 17 is pressed into the said bore 16a and has its free end provided with a collar 18 or the like.

Finally, FIG. 11 shows an embodiment according to which the pin 5h is at one of its ends provided with a spring ring 12b, whereas the other end after effected assembly is provided with an upset portion 19.

All of the embodiments described so far have the most important feature namely the length of the safety means. When the chuck is connected to the machine, the left end of the safety means engages the end face of the spindle or the chuck connecting flange 6, whereas the right hand end thereof extends into the path of the basic chuck 2. When the chuck is removed, the safety means can be turned back to such an extent or can escape in such a way that the basic jaw 2 will become free while the safety means cannot completely drop out of the chuck body 1.

It is, of course, to be understood that the present invention is, by no means, limited to the particular embodiments illustrated in the drawings but also comprises any modifications within the scope of the invention.

What I claim is:

1. A jaw chuck, which includes: a chuck body, a jaw means radially adjustable in said chuck body, safety pin means built into said chuck body and axially movably extending in the axial direction of said chuck body, said pin means being movable into a first position to form an abutment for said jaw means to prevent said jaw means from accidentally leaving said chuck body in radially outward direction, said pin means being adapted when said chuck is in operative condition to be held in said first position, said pin means also being axially movable from said first position to a second position out of the path of said jaw means to permit radial withdrawal thereof from said chuck body, said pin means comprising at least one pin respectively associated with said jaw means and provided with an abutment means, and said chuck body comprising a groove respectively adjacent said pin and having an inner end face for engagement with the pin abutment means when said pin is in said first position, and abutment means respectively arranged within said groove in axially spaced relationship from said end face by a distance to permit the desired maximum axial movement of said pin, said last named abutment means engaging said pin abutment means when the pin is in said second position.

2. A jaw chuck according to claim 1, in which said pin is provided with a collar forming said pin abutment means.

3. A jaw chuck according to claim 1, in which said pin abutment means are formed by spring means respectively inserted in said pin.

4. A jaw chuck, which includes: a chuck body, jaw means radially adjustable in said chuck body, safety pin means built into said chuck body and axially movably extending in the axial direction of siad chuck body, said pin means being movable into a first position to form an abutment for said jaw means to prevent said jaw means from accidentally leaving said chuck body in radially outward direction, said pin means being adapted when said chuck is in operative condition to be held in said first position, said pin means also being axially movable from said first position to a second position out of the path of said jaw means to permit radial withdrawal thereof from said chuck body, said pin means comprising at least one pin respectively associated with said jaw means and provided with first abutment means and second abutment means axially spaced from said first abutment means, and said chuck body being provided with a groove respectively adjacent said pin, said groove comprising a first groove end portion with a first inner abutment surface and a second groove end portion with a second inner abutment surface, said first abutment means being operable to engage said first inner abutment surface when the respective pin is in said first position, said second abutment means being operable to engage said second inner surface when the respective pin is in said second position.

References Cited

UNITED STATES PATENTS 3,142,492  7/1964  Multer _____ 279—123
3,249,364  5/1966  Scharfen _____ 279—123 X

FOREIGN PATENTS 304,912  4/1955  Switzerland.

ROBERT C. RIORDON, Primary Examiner